United States Patent
Fayet et al.

(10) Patent No.: US 9,593,216 B2
(45) Date of Patent: Mar. 14, 2017

(54) PACKAGING LAMINATE, METHOD FOR MANUFACTURING OF THE PACKAGING LAMINATE AND PACKAGING CONTAINER PRODUCED THERE FROM

(75) Inventors: Pierre Fayet, Lausanne (CH); Gil Rochat, Villarimboud (CH); Alain Bonnebault, Lausanne (CH); Yves Leterrier, Lausanne (CH); Bandeep Singh, Neuenhof (CH); Jan-Anders Månson, Chexbres (CH)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 1457 days.

(21) Appl. No.: 12/593,704

(22) PCT Filed: Apr. 4, 2007

(86) PCT No.: PCT/EP2007/003022
§ 371 (c)(1),
(2), (4) Date: Nov. 13, 2009

(87) PCT Pub. No.: WO2008/122293
PCT Pub. Date: Oct. 16, 2008

(65) Prior Publication Data
US 2010/0112255 A1    May 6, 2010

(51) Int. Cl.
*B32B 27/08* (2006.01)
*B32B 27/10* (2006.01)
(Continued)

(52) U.S. Cl.
CPC .............. *C08J 7/045* (2013.01); *B32B 27/08* (2013.01); *B32B 27/10* (2013.01);
(Continued)

(58) Field of Classification Search
CPC ......... Y10T 428/1068; Y10T 428/1379; Y10T 428/265; Y10T 428/1064; C09D 1438/04;
(Continued)

(56) References Cited

U.S. PATENT DOCUMENTS 3,306,800 A * 2/1967 Plueddemann ............... 156/329
4,105,821 A * 8/1978 Blaich et al. .................. 428/215
(Continued)

FOREIGN PATENT DOCUMENTS

EP    1 464 480 A1    10/2004
EP    1 787 796 A1    5/2007
(Continued)

OTHER PUBLICATIONS

Matyjaszewski, K., and Thomas P. Davis, Handbook of Radical Polymerization. Hoboken: Wiley-Interscience. 2002, p. 191, ISBN 0-471-39274-x.*
(Continued)

*Primary Examiner* — Lee Sanderson
(74) *Attorney, Agent, or Firm* — Buchanan, Ingersoll & Rooney PC

(57) ABSTRACT

A barrier film for packaging food or beverage comprises a polymer base film, and a barrier layer comprising an inorganic oxide applied onto the base film by vapor deposition. The inorganic oxide layer is further coated with a healing layer of a crosslinked organopolysiloxane which is covalently bound to the inorganic layer. Other aspects disclosed here involve a multilayer packaging laminate comprised of the barrier film, and a method of manufacturing the barrier film and packaging containers manufactured from the film.

19 Claims, 9 Drawing Sheets

Figure 1:
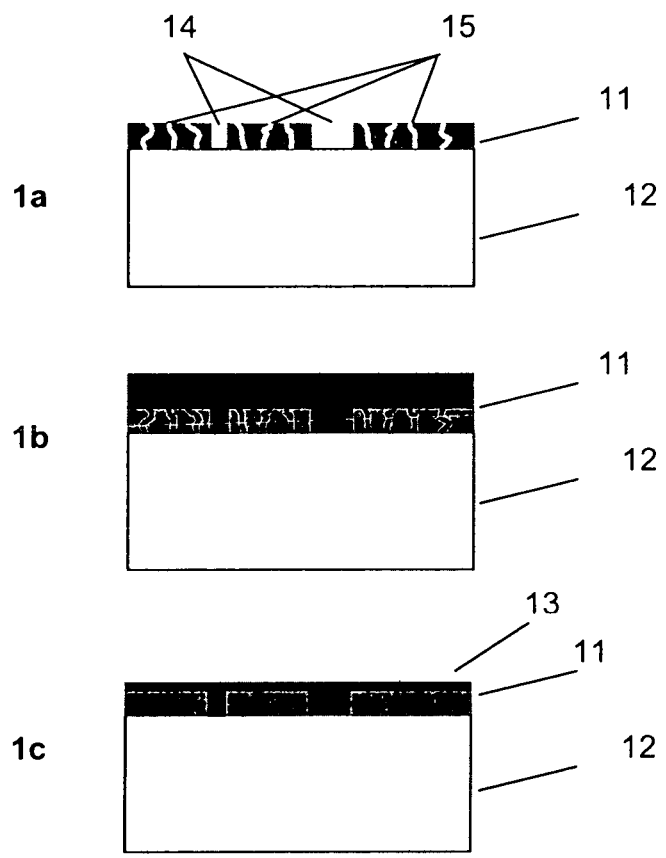

(51) Int. Cl.
*B32B 27/34* (2006.01)
*B65D 81/24* (2006.01)
*C08J 7/04* (2006.01)

(52) U.S. Cl.
CPC ........ *C08J 2367/02* (2013.01); *C08J 2377/00* (2013.01); *Y10T 428/1379* (2015.01); *Y10T 428/265* (2015.01); *Y10T 428/31663* (2015.04)

(58) Field of Classification Search
CPC ......... B32B 27/08; B32B 27/32; B32B 27/34; C08J 7/045
USPC ..... 428/474.4, 477.7, 479.6, 446, 447, 36.7, 428/35.7, 450, 35.8, 35.9; 427/487; 383/113
See application file for complete search history.

(56) References Cited

U.S. PATENT DOCUMENTS

| | | | | |
|---|---|---|---|---|
| 4,133,938 A * | 1/1979 | Bingham | .................. | 428/447 |
| 4,247,354 A * | 1/1981 | Ward et al. | .................. | 156/329 |
| 4,351,876 A * | 9/1982 | Doi et al. | .................. | 428/349 |
| 4,364,731 A * | 12/1982 | Norling et al. | .................. | 433/218 |
| 4,666,981 A * | 5/1987 | Doura et al. | .................. | 525/100 |
| 4,795,775 A * | 1/1989 | Baile et al. | .................. | 524/379 |
| 5,434,008 A * | 7/1995 | Felts | .................. | 428/461 |
| 5,516,555 A * | 5/1996 | Felts | .................. | 427/255.23 |
| 5,731,092 A * | 3/1998 | Breant et al. | .................. | 428/448 |
| 5,770,301 A * | 6/1998 | Murai et al. | .................. | 428/213 |
| 5,804,300 A * | 9/1998 | Maro et al. | .................. | 428/335 |
| 5,942,320 A * | 8/1999 | Miyake et al. | .................. | 428/216 |
| 6,136,444 A * | 10/2000 | Kon et al. | .................. | 428/423.1 |
| 6,602,564 B1 * | 8/2003 | Komori et al. | .................. | 428/34.9 |
| 6,743,512 B2 * | 6/2004 | Murata et al. | .................. | 428/423.1 |
| 6,777,610 B2 * | 8/2004 | Yamada et al. | .................. | 136/251 |
| 6,818,310 B2 * | 11/2004 | Namiki et al. | .................. | 428/446 |
| 6,866,949 B2 * | 3/2005 | Ota et al. | .................. | 428/702 |
| 7,192,625 B2 * | 3/2007 | Ohkawa et al. | .................. | 427/255.29 |
| 7,288,313 B2 * | 10/2007 | Sasaki et al. | .................. | 428/216 |
| 7,306,852 B2 * | 12/2007 | Komada | .................. | 428/446 |
| 7,341,766 B2 * | 3/2008 | Kishimoto et al. | .................. | 428/1.6 |
| 7,459,214 B2 * | 12/2008 | Olofsson et al. | .................. | 428/451 |
| 7,538,177 B2 * | 5/2009 | Eriguchi et al. | .................. | 528/205 |
| 7,763,335 B2 * | 7/2010 | Oshita et al. | .................. | 428/35.2 |
| 7,811,669 B2 * | 10/2010 | Fujii et al. | .................. | 428/451 |
| 7,820,255 B2 * | 10/2010 | Okubo et al. | .................. | 428/1.6 |
| 7,847,209 B2 * | 12/2010 | Namiki et al. | .................. | 219/121.47 |
| 2001/0038894 A1 * | 11/2001 | Komada | .................. | 428/34.6 |
| 2003/0068534 A1 * | 4/2003 | Ohkawa et al. | .................. | 428/701 |
| 2004/0018364 A1 | 1/2004 | Ota et al. | | |
| 2004/0115445 A1 * | 6/2004 | Sasaki et al. | .................. | 428/451 |
| 2005/0214556 A1 * | 9/2005 | Nishimi et al. | .................. | 428/500 |
| 2006/0029757 A1 * | 2/2006 | Komada | .................. | 428/35.7 |
| 2011/0236706 A1 * | 9/2011 | Uebayashi et al. | .................. | 428/483 |
| 2012/0040107 A1 * | 2/2012 | Hasegawa et al. | .................. | 428/1.1 |

FOREIGN PATENT DOCUMENTS

| | | |
|---|---|---|
| EP | 1 849 593 A1 | 10/2007 |
| JP | 10-156998 A | 6/1998 |
| JP | 2002-52636 | 2/2002 |
| JP | 2005-186402 A | 7/2005 |
| JP | 2005-324361 | 11/2005 |
| JP | 2005-324361 A | 11/2005 |
| JP | 2006-256091 A | 9/2006 |
| WO | WO 98/22656 A1 | 5/1998 |
| WO | WO 99/50066 | 10/1999 |
| WO | 2005/007518 A2 | 1/2005 |
| WO | WO 2006/087941 A1 | 8/2006 |

OTHER PUBLICATIONS

Jackson et al., Development of a Hermetic Barrier Using Vinyl Triethoxysilane (VTEOS) and Sol-Gel Processing, Material Matters, 2006, Sigma-Aldrich, St. Louis, pp. 11 and 12.*
International Search Report (PCT/ISA/210) dated Jan. 10, 2008.
English translation of "The First Office Action" dated Sep. 7, 2011, issued in corresponding Chinese Application No. 200780052506.5.
English translation of "Notice of Reasons for Rejection" dated Dec. 20, 2011, issued in corresponding Japanese Patent Application No. 2010-501374.
English translation of "Preliminary Conclusion (on non-Patentability)" dated Jul. 7, 2011, issued in corresponding Ukraine Patent Application No. a200910058/M, Ministry of Science and Education of Ukraine State Department of Intellectual Property.
XP-002464089, abstract of JP 2005324361 dated Nov. 24, 2005.
English translation of a Chinese Office Action ("Notification of the Second Office Action") dated Aug. 23, 2012, issued in corresponding Chinese Application No. 200780052506.5.

* cited by examiner

PACKAGING LAMINATE, METHOD FOR MANUFACTURING OF THE PACKAGING LAMINATE AND PACKAGING CONTAINER PRODUCED THERE FROM

TECHNICAL FIELD

The present invention relates to a barrier film for packaging of food or beverage comprising a base film of a polymer and applied onto the base film, a barrier layer comprising an inorganic oxide deposited by a vapour deposition method. The invention also relates to a packaging laminate for packaging of food or beverage comprising such a barrier film and to packaging containers made from the packaging laminate. The invention further relates to a method for manufacturing of the barrier film of the invention.

PRIOR ART AND PROBLEMS

For the packaging of food and beverage it is important to minimise the influence of gases, vapours and light permeating from the outside of the packaging container, through the packaging material, on the packaged food product, in order to extend the "shelf life", i.e. the time the food product can spend in the sealed and stored package before use. The packaging process may be carried out under aseptic conditions, i.e. the food product as well as the packaging material itself are reduced from bacteria and the filled packaging container is produced under clean circumstances, whereby it becomes possible to store the food product for a very long time, even at ambient storage, provided that the choice and the design of the packaging material are right. One important factor for long-term storage is the gas barrier properties of the filled and sealed packaging container, which in turn is highly dependent on the gas barrier properties of the packaging laminate itself. Oxygen has a detrimental effect on the nutritional value by accelerating degradation of the food product. Furthermore, sufficient water vapour barrier properties of the packaging laminate is an important factor for long term storage, in order to keep the packaged content at the same volume and humidity as when initially packed.

Also barrier properties against migrating polar and non-polar aroma substances are important depending on the storage time and the product packed. Especially for fruit juices, such properties are highly relevant. Very important for the general performance of the packaging laminate is the integrity of the laminate, i.e. the internal adhesion between the layers of the laminate, also after long time storage and under difficult climate conditions.

Various films and multilayer laminated packaging materials have been proposed in the prior art to provide these functionalities of gas barrier, especially oxygen barrier properties, water vapour barrier and light barrier properties. Such films and flexible multilayer laminates are used as wrappings, bags and pouches for the packaging of various food products. In particular, liquid or flowable food products, such as for example milk and juice beverages or crushed tomatoes, may be packaged in such flexible materials by a high-speed continuous filling, forming and sealing process. In such a process, a continuously running web of the laminated material is formed into a continuous tube, sterilised, filled with the food product, sealed and cut into packages. The sealing is carried out by heat generation in the outermost polymer layers of the laminate, such that these outermost heat seal layers are irreversibly melted together under pressure application, in order to form a sealed pouch or pillow-shaped package.

Similar rigid or semi-rigid packaging containers of the single use disposable type for liquid foods are often produced from a packaging laminate having a core layer of paper or paperboard. One such commonly occurring packaging container is marketed under the trademark Tetra Brik Aseptic® and is principally employed for liquid foods such as milk, fruit juices etc. Such Tetra Brik Aseptic® packaging containers are also generally produced by means of modern high-speed packaging machines of the type that form, fill and seal packages from a web or from prefabricated blanks of packaging material. From a web, for example, packaging containers are produced in that the web is reformed into a tube by both of the longitudinal edges of the web being united to one another in an overlap joint. The tube is filled with the intended liquid food product and is divided into individual packages by repeated transversal seals of the tube at a distance from one another below the level of the contents in the tube. The packages are separated from the tube by incisions in the transverse seals and are given the desired geometric configuration, normally parallelepipedic, by fold formation along prepared crease lines in the paperboard packaging material. The main advantage of this continuous tube-forming, filling and sealing packaging process concept is that the web may be sterilised continuously just before tube-forming, thus providing for the possibility of an aseptic packaging process, such that the filled package may be stored for a long time even at ambient temperature, without the risk of growth of micro-organisms in the filled product. Another important advantage of the Tetra Brik®-type packaging process is, the possibility of continuous high-speed packaging in modern packaging machines, which has considerable impact on cost efficiency.

The packaging material in such a known rigid packaging container is typically a laminate comprising a bulk core layer of paper or paperboard and outer, liquid-tight layers of thermoplastics. In order to render the packaging container light- and gas-tight, in particular oxygen gas-tight, for example for the purpose of aseptic packaging and for packaging of fruit juices, the laminate for these packaging containers is normally provided with at least one additional layer, most commonly an aluminium foil.

There are some drawbacks with packaging laminates having a gas barrier layer of aluminium foil, for some certain purposes, e.g. packaging of food products intended for preparation, heating-up or thawing in a microwave oven. The packaging laminate in such cases needs to be removed before exposing the food to microwaves. Another drawback with aluminium foil is that it is a rather expensive material, compared to many other barrier materials.

Polymer films coated by means of vapour deposition with nanometer thick inorganic oxide coatings are widely used in food packaging industry as barrier layers against oxygen and/or water vapour. Especially interesting for the food packaging industry are the nanometer thick, glass-like layers of a formula $SiO_x$ or $SiO_xC_y$, which may be applied by means of any reactive evaporation method. Other interesting inorganic oxide barrier materials in the food packaging industry are the aluminium oxides ($AlO_x$). Furthermore, thin, nanometer thick, metallised layers are often used to provide oxygen and water vapour barriers in multilayer packaging laminates, such as e.g. aluminium metallised layers. In comparison to aluminium foil, however, these coatings have lower oxygen barrier properties and are less flexible.

A common problem with all kinds of vapour deposited layers is the formation of pinholes, cracks and other defects of sizes ranging from the nanometer scale to the micrometer scale. These defects cause a residual permeation of substances, especially oxygen, through a packaging laminate comprising a SiOx layer, of typically above 0.1-$cm^3/m^2/$day/atm and of water vapour of typically above 0.1 $g/m^2/$day. Such cracks and defects are to some extent present initially in the freshly vapour deposition coated materials, but mainly arise due to thermal and mechanical stress during handling and laminate converting operations, during the forming of the film or laminate and the heat sealing into a sealed package and, of course, at handling and distribution of the filled and sealed packaging container. Especially, extrusion lamination by hot melted polymer as well as the heat sealing operation impose considerable thermal stress on the thin vapour deposited barrier layer. In short, all kinds of strain on the thin deposited layer need to be under a certain level in order to keep the layer intact and to provide the desired barrier properties in the resulting filled and sealed packaging container. Although, this level is satisfactory in many cases, there is a desire for increased robustness regarding the barrier properties of such films.

One possible way to reduce this problem to some extent is to use polymer base films having a very smooth and even surface in order to reduce the number of defects in the oxide layer. This measure taken does not, however, improve the quality of the coating at the top surface of the inorganic layer.

In flexible wrappings and pouch material, as well as in the more rigid paper or paperboard packaging laminates, the demands on flexibility and strength of the inorganic barrier material at straining of the film or laminated material are very high. In particular, regarding paperboard or carton packaging containers the barrier material is subjected to extreme conditions, when bending and folding the thick paperboard laminate several times at the same spot of the laminate. This occurs at some locations in a fold-formed package, e.g. at so-called K-creases, where the laminate is folded more than just one time to form the top and bottom portions of a parallellepipedic-shaped package. There is thus a need to improve the durability and flexibility of such vapour deposited inorganic layers and also their barrier properties.

DISCLOSURE OF THE INVENTION

It is, therefore, an object of the present invention to overcome or alleviate the above-described problems.

It is a general object of the invention to provide a film for packaging of food or beverage, having a vapour deposited layer comprising an inorganic oxide applied onto a polymer base layer, having improved barrier properties.

It is a further general object of the invention to provide a film for packaging of food or beverage, having a vapour deposited layer comprising an inorganic oxide applied onto a polymer base layer, having improved toughness and flexibility.

A specific object of the invention is to provide a film for packaging of food or beverage, having a vapour deposited layer of an inorganic silicon oxide, (SiOx or SiOxCy) applied onto a polymer base layer, having improved oxygen and water vapour barrier properties as well as improved toughness and flexibility.

Another specific object of the invention is to provide a film for packaging of food or beverage, having a vapour deposited layer of aluminium oxide, (AlOx) applied onto a polymer base layer, having improved oxygen and water vapour barrier properties as well as improved toughness and flexibility.

A further object of the invention is to provide a flexible multilayer packaging laminate for aseptic and long-term packaging of food or beverage, including a barrier film comprising a vapour deposited layer of an inorganic oxide applied onto a polymer base layer, having improved barrier properties and improved toughness and flexibility.

Yet a further object of the invention is to provide a rigid or semi-rigid multilayer packaging laminate for aseptic and long-term packaging of food or beverage, including a barrier film comprising a vapour deposited layer of an inorganic oxide applied onto a polymer base layer, having improved barrier properties, toughness and flexibility, as well as good package integrity by the good adhesion between the barrier layer and an adjacent polymer layer.

The invention is also directed to a packaging container filled with a food or beverage product and produced from a packaging laminate comprising the barrier film.

In addition, the invention is directed to a method for manufacturing of the improved barrier film of the invention.

These objects are attained according to the present invention by the barrier film, the flexible multilayer packaging laminate and the packaging laminate for rigid or semi-rigid food or beverage containers, the packaging container and the method as defined in the appended claims.

These objects are thus attained according to the present invention by a further coating onto the vapour deposited inorganic oxide layer, which coating is consisting of a crosslinked organo-polysiloxane, which is covalently bound to the inorganic oxide layer and functions as a healing layer.

Such a crosslinked healing layer has particularly positive effects on the toughness, flexibility and barrier properties of vapour deposited silicon oxide coatings, but positive effects are expected for any inorganic oxide having similar chemistry to silicon oxides, such as for example aluminium oxides, magnesium oxides, titanium oxides and other metal oxides. Positive effects will also be achieved regarding the toughness and barrier properties of metallised layers, insofar as the metallised layer comprises an oxide of the metal on the surface of the layer, and comprises OH groups. This is often the case regarding aluminium layers deposited by means of chemical reactive vapour deposition, for example. Generally, thin coatings of pure metal or a mixture of metal and metal oxide provide barrier properties against water vapour and are used when the desired function is to prevent water vapour from migrating into and through the multilayer film or packaging laminate. Most preferably, the metal in a metallisation coating is aluminium (Al) mixed with aluminium oxide (AlOx), especially at the surface of the metallised layer. Such mixed layers of metal and metal oxide in addition provide a metallic appearance and often also a barrier to light.

The coating of a crosslinked organo-polysiloxane is bound to the inorganic oxide layer by covalent bounds evenly and densely distributed over the interface between the vapour deposited inorganic oxide layer and the organo-polysiloxane layer.

Preferably, the inorganic oxide-containing coatings are applied by means of physical vapour deposition (PVD) or reactive vapour deposition (CVD) and, more preferably, by plasma enhanced chemical vapour deposition (PECVD), wherein a vapour of metal or silicon compounds is deposited onto the substrate under oxidising circumstances, thus forming an amorphous metal oxide or silicon oxide layer.

This type of coatings provide gas barrier properties to a coated film as well as some degree of water vapour barrier properties, and are transparent coatings, which may be preferred in some cases.

An especially preferred silicon oxide coating especially has the formula SiOxCy, wherein carbon is covalently bound in the formula and x varies between 0.1 and 2.5, and y may vary between 0.1 and 2.5. Such carbon-containing coatings have improved water vapour barrier in addition to gas barrier properties.

Another preferred coating is a silicon oxide coating of the formula $SiO_xC_yN_z$, wherein the carbon atoms and the nitrogen atoms are covalently bound and x is from 0.1 to 2.5, y is from 0.1 to 2.5 and z is from 0.1 to 2.5.

Preferably, a sole coating of SiOxCyNz has a thickness of from 5 to 100 nm and is deposited by PECVD using a process gas mixture comprising an organosilicon compound and nitrogen as the carrier gas.

The thin vapour deposited inorganic-oxide comprising layers according to the invention are nanometer-thick, i.e. they have a thickness that is most suitably counted in nanometers, for example of from 5 to 500 nm, preferably from 5 to 200 nm, and more preferably from 5-100 nm.

A further preferable coating is a coating of aluminium oxide having the formula AlOx wherein x varies from 1.0 to 1.5, preferably of $Al_2O_3$. Preferably, the thickness of such a coating is from 5 to 100 nm, preferably from 5 to 30 nm.

Deposition by a plasma enhanced chemical vapour deposition method (PECVD) is preferred for the deposition of inorganic oxide coatings, because of cost advantages and the advantageous barrier and flexibility qualities obtained of the coating, but also other vapour deposition methods, i.e. any reactive evaporation or electron beam reactive evaporation method or any heat evaporation method, are feasible for this invention. These methods are normally batch-wise processes, requiring a reaction chamber with under-pressure or vacuum for the reactive evaporation operation. A PECVD method is more thoroughly described in U.S. Pat. No. 5,224,441.

On the other hand, deposition by an atmospheric plasma method is also advantageous and desirable because it is a continuous coating method, enabling easier control and logistics of the production of coated film. Another, such continuous and highly desirable atmospheric vapour deposition coating method is the so-called flame coating or combustion chemical vapour deposition (CCVD) method.

The polymer base film comprises a layer for receiving the vapour deposited material, which layer is made of a material suitable for receiving the functional layer with good adhesion and coating quality. Suitably the material is a thermoplastic polymer material having a Tg (glass temperature) higher than or equal to −10° C. Such polymer materials are generally more suitable for substrate layers for heat-generating coating operations, because they have other melt behaviour characteristics than, on the other hand polyethylene, for example. Examples of such high-Tg polymer materials are selected from the group that consists of polyamide (PA), polyamide copolymer, polyester, and polyester copolymer. Examples are polyethylene terephthalate (PET) and copolymers (PET-X), such as for example polyethylene terephthalate modified with glycol units (PET-G), polybutylene terephthalate (PBT) and polyethylene naphthalate (PEN). These polymers all have Tg's above room temperature. Also polypropylene is a polymer having the required Tg, i.e. a Tg of just about −°10 C. Preferably, the base film or layer is made of polyethyleneterephthalate (PET) or polyamide (PA), and most preferably of polyamide, because polyamides provide a smooth surface for receiving a vapour deposited coating which improves the quality and properties of the coating. Practical requirements on the base film thickness may provide a lower thickness limit at about 10 μm, while an upper limit of about 30 μm appears reasonable, for cost reasons. Examples of polyamides, suitable but not limiting to the invention, are PA-6, PA-6,6 and PA-6,6,6. However, all polyamides suitable for film manufacturing are also suitable substrates for the film of the present invention.

The healing layer coating is thus a crosslinked reaction product from a composition consisting essentially of unsaturated silanes having three silanol-forming groups. It is important for the inventive results that the composition consists of essentially only unsaturated silanes and possibly only minor amounts of a similar saturated silane compound. Such minor amounts should constitute less than 5 weight-% of the total of the silane compounds of the composition, preferably less than 3 weight-%. Similarly, a minor amount of unsaturated silanes having only two silanol-forming groups may be present in the composition, but it should constitute less than 5 weight-%, preferably less than 3 weight-%, of the total composition. To conclude, the content of silanes other than unsaturated silanes having three silanol-forming groups should be less than 10 weight-% of the total silane coating composition.

The unsaturated, reactive silane having three silanol-forming groups may generally be represented by the formula R—Si—$X_3$, where R is a radical which contains a functional group capable of undergoing free radical polymerisation and X is a hydrolysable radical. Representative R substituents may include gammamethacryloxypropyl, gammaacryloxypropyl, vinyl or allyl. Representative silanol-forming X substituents may include acetoxy and alkoxy having 1- to 8 carbons such as for example methoxy, ethoxy, isobutoxy, methoxymethoxy, ethoxymethoxy and ethoxyphenoxy. Preferably, the reactive silanes employed are selected from the group consisting of vinyltrimethoxysilane, vinyltriethoxysilane, allyltrimethoxysilane, allyltriethoxysilane, butenyltrimethoxysilane, butenyltriethoxysilane, gamma-metacryloxypropyltriethoxysilane, gamma-metacryloxypropyltrimethoxysilane, gamma-acryloxypropyltriethoxysilane, gamma-acryloxypropyltrimethoxysilane, vinyltriacetoxysilane and mixtures thereof. These reactive silanes are the most suitable for use in materials in connection with food packaging. The most preferred reactive silane is selected from the group consisting of vinyl vinyltrimethoxysilane and vinyltriethoxysilane.

The thickness of the coated but un-crosslinked organosiloxane oligomer is within the range of from 1 to 50 nm, preferably from 1 to 40 nm, more preferably from 1 to 30 nm, most preferably from 10 to 30 nm. After crosslinking, the thickness of the coated organopolysiloxane will naturally be lower than before crosslinking.

According to a second aspect of the invention, the barrier film as described above is useful in multilayer flexible food packaging laminates as well as in rigid or semi-rigid food packaging laminates, comprising a core layer of paperboard or carton and outermost, heat sealable, liquid tight layers of a thermoplastic polymer material.

According to a third aspect of the invention, the thus obtained packaging laminates are suitable for conversion into packaging containers for long-term and aseptic packaging of food or beverage.

According to a further aspect of the invention, the barrier film of the invention is manufactured by a method comprising the steps of providing a base film of a polymer, applying onto the base film, a barrier layer comprising an inorganic oxide by means of a vapour deposition method and further coating said vapour deposited inorganic layer, wherein the further coating step comprises the steps of providing a composition consisting essentially of a reactive unsaturated silane compound having three silanol-forming groups dissolved in a solvent, coating the composition onto the inorganic vapour deposited layer, subjecting the coated composition to hydrolysis and condensation reaction to provide an ethylenically unsaturated organosiloxane oligomer, which is covalently bound to the inorganic layer and, finally, curing the coated organosiloxane oligomer to provide the crosslinked polysiloxane layer. A separate drying step is normally not needed, because the solvent is evaporated off automatically during the chemical reactions.

The reactive silane coating composition is applied as a liquid film on top of the inorganic layer by means of any suitable liquid film coating method, as a solution of from 1 to 10 weight-%, preferably from 2 to 6 weight-%, more preferably from 3 to 6 weight-% of the reactive silane in solvent, preferably in ethanol. Preferably, the coating solution is applied by means of a transfer roller, which is dipped into the solution and rolled onto the inorganic layer film. At application of the coating, the coated composition penetrates down into the micrometer- and nanometer-sized cracks and pinholes of the inorganic layer, whereafter the composition is hydrolysed and further subjected to condensation reaction such that the silanol-forming groups are partly condensed within the organosilane composition layer into an organosiloxane oligomer, as well as partly condensed with hydroxyl groups formed on the surface of the inorganic oxide substrate layer. Subsequently, the organosiloxane oligomer is crosslinked at the sites of carbon-to-carbon unsaturation, whereby a crosslinked polyorganosiloxane layer is obtained, which is tightly bound to the inorganic oxide substrate layer by covalent bonds.

The thickness of the thus applied reactive silane solution may vary from 1 to 50 nm, preferably from 10 to 30 nm, as measured before condensation and curing.

The reaction product at the interface between the inorganic oxide layer and the polyorganosiloxane layer may be referred to as a hybrid material rather than two separate layers. The two materials are reacted with each other by closely situated covalent bonds extending over the whole surface of the barrier film, and there is no longer a distinct border between the layers. Consequently, the layers are inseparable and will not delaminate or detach from each other at any point within the barrier hybrid layer. Moreover, due to the more organic nature of the organopolysiloxane, better adhesion is obtained to the subsequently extrusion laminated or otherwise laminated polymer layer, than in the case of a mere vapour deposited metal oxide layer such as SiOx.

Preferably, the curing step is carried out by crosslinking by means of irradiation energy and according to a preferred embodiment, UV irradiation is employed in combination with the inclusion of a photoinitiator in the healing layer coating composition. The concentration of the photoinitiator included in the healing layer coating composition is suitably from 1 to 10 weight-%, preferably from 2 to 5 weight-%, more preferably from 3 to 5 weight-%, most preferably from 3 to 4 weight-%. A photoinitiator having an amino-functional group is preferred, due to better results of the coated barrier layer obtained.

According to a yet further aspect of the invention, there is provided a rigid packaging container manufactured from the packaging laminate of the invention, having properties such as low oxygen permeation rate, package integrity and internal adhesion between laminate layers, which properties are at the same level as the prior art aluminium foil packaging containers, commercially available today for liquid food packaging.

EXAMPLES AND DESCRIPTION OF PREFERRED EMBODIMENTS

Figure 2A:
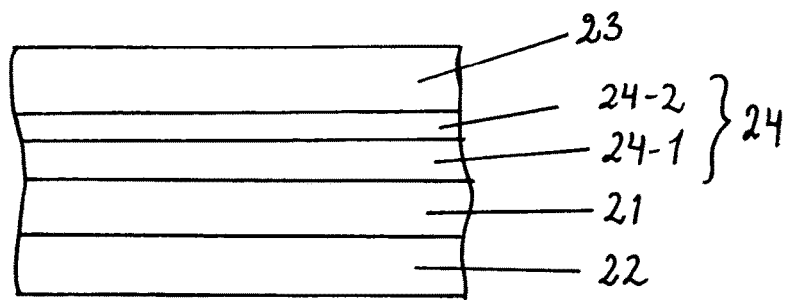
Figure 2B:
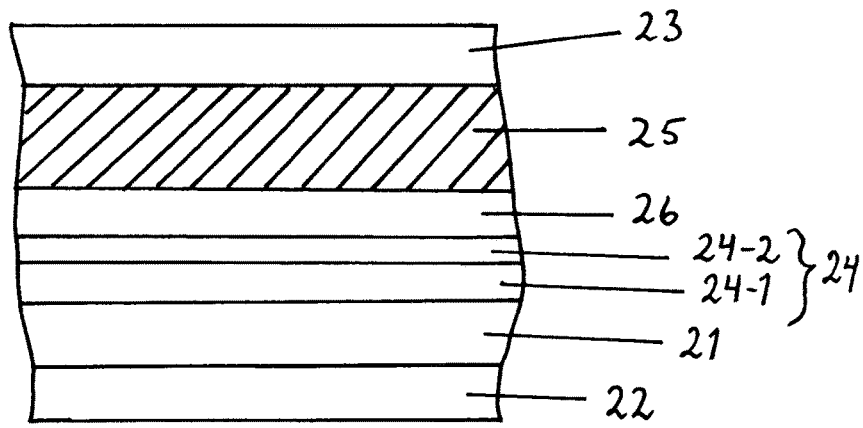
Figure 3:
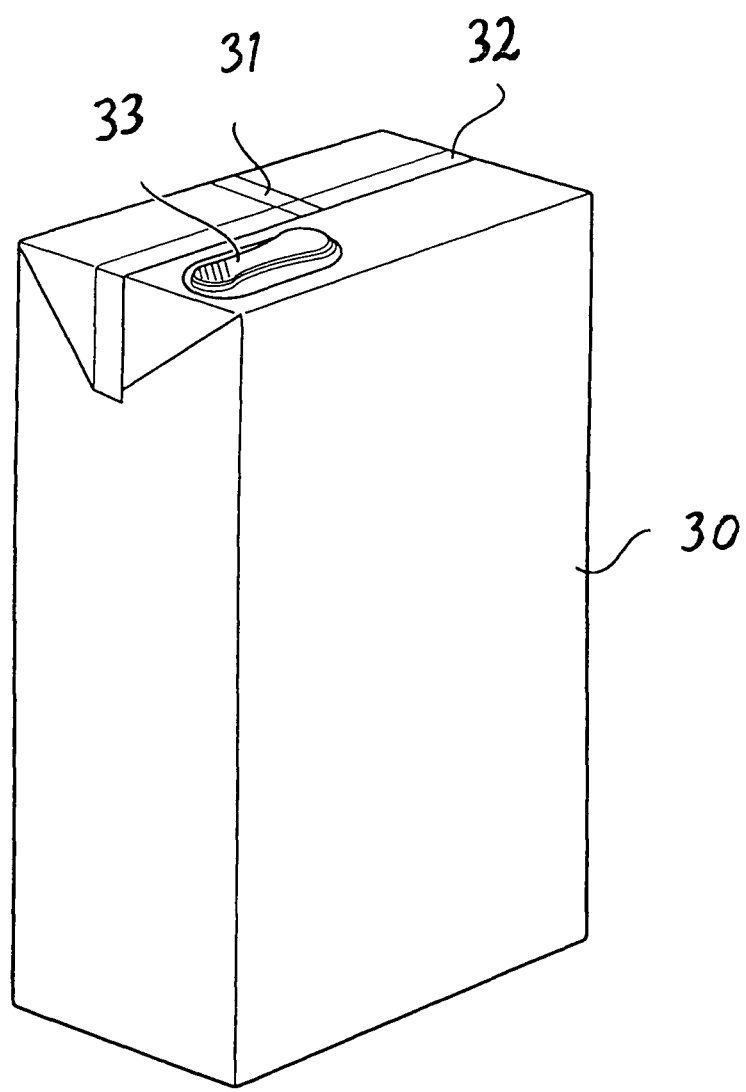
Figure 4:
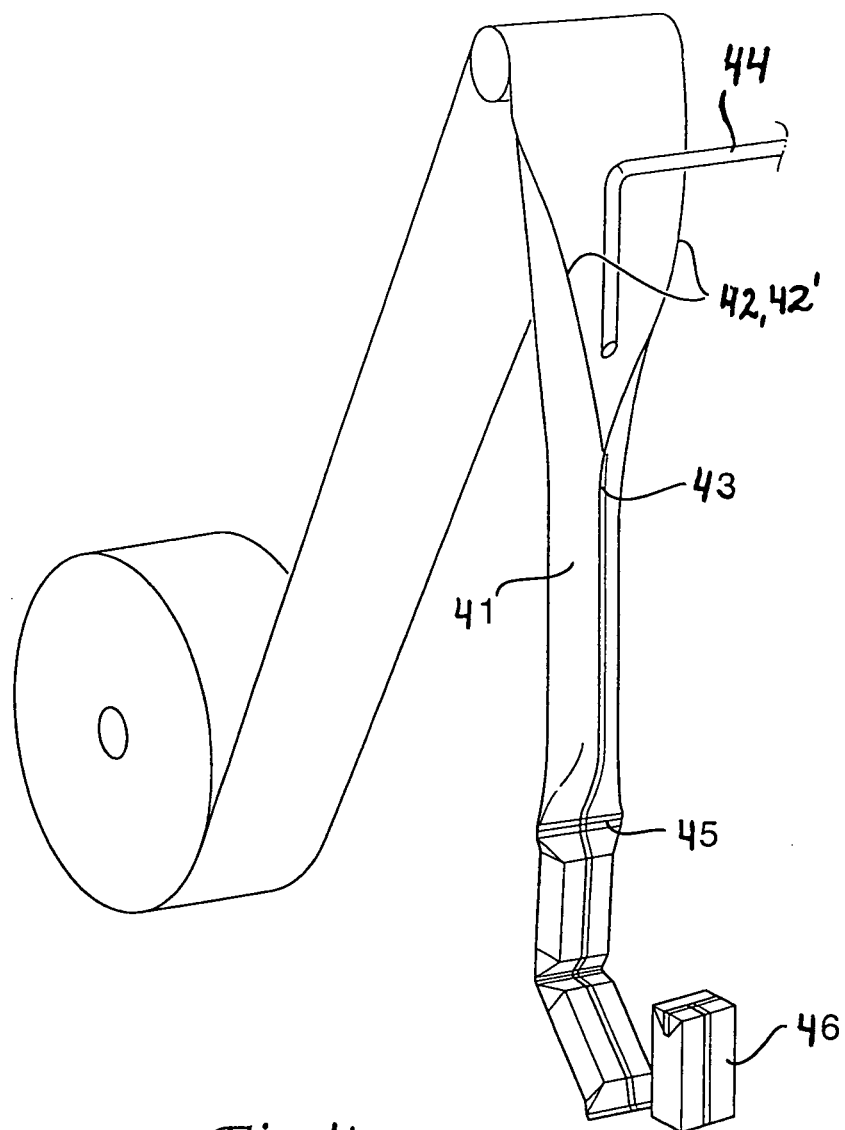
Figure 5:
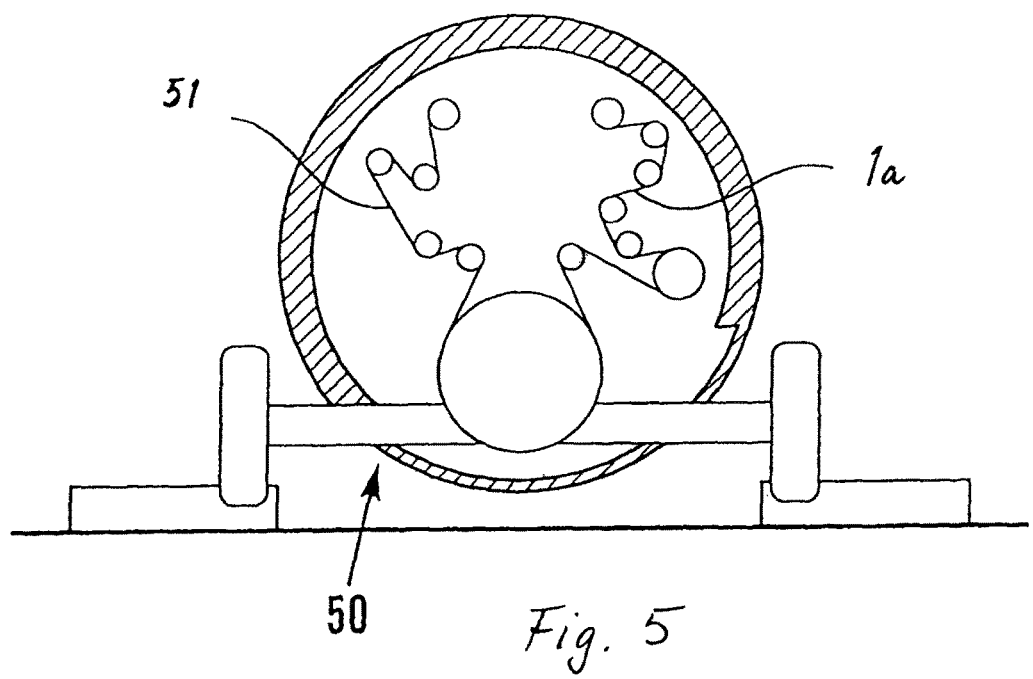

In the following, preferred embodiments of the invention will be described with reference to the drawings, of which:

FIGS. 1a, 1b and 1c are schematically showing, in cross-section, the steps of the creation of the barrier layer in the barrier film according to the invention, FIGS. 2a, and 2b are each respectively schematically showing an embodiment of a packaging laminate according to the invention, FIG. 3 is showing an example of a packaging container produced from a packaging laminate according to the invention, FIG. 4 is showing the principle of how such a packaging container is manufactured from the packaging laminate in a continuous form, fill and seal process, FIG. 5 is showing a plant for PECVD coating of SiOx or SiOxCy onto a base film, and FIG. 6-9 are graphs showing the relationship between oxygen transmission and nominal strain of the respective tests of hybrid layers described in the Examples.

FIG. 1 thus shows how the hybrid barrier layer of the invention is created. At FIG. 1a, the micro-sized and nano-sized defects 14; 15 of the inorganic oxide (preferably silicon oxide) layer 11 are shown and at FIG. 1b, the defects are filled with the organosilane monomer/oligomer. The base film 12 which is a polymer film, preferably has a very smooth surface for obtaining optimal barrier properties of the inorganic layer. After hydrolysis, at FIG. 1c, the organosilane monomer/oligomer units undergoes condensation reaction with each other and with the oxide surface hydroxyl/silanol groups and, subsequently, are polymerised by an external source of UV irradiation, to form a cross-linked organopolysiloxane layer 13 on the oxide substrate surface. Accordingly, gas and vapour permeation linked to defects in the inorganic oxide layer is reduced and, hence, the barrier properties of the hybrid material increase. In parallel, the toughness of the coated and healed inorganic oxide layer is improved such that the crack onset strain (COS) shifts to a higher level. The COS is the strain level at which the oxygen transmission is still unaffected, before it is rapidly increased, due to the increased amount of cracks appearing in the barrier layer.

In FIG. 2a, there is shown, in cross-section, a first embodiment of a flexible multilayer packaging laminate 20a produced according to the invention.

The laminate comprises a base layer 21 of PET, outer liquid-tight and heat sealable polyolefin-based layers 22, 23, and a hybrid barrier layer 24, which is applied onto the PET base layer, and composed of a first vapour deposited, by means of PECVD, silicon oxide layer 24-1 and a second, covalently bound, layer of a cross-linked organopolysiloxane 24-2. The outer liquid tight and heat sealable layers 22, 23, comprise a polyolefin, such as preferably polyethylene, more preferably a low density polyethylene (LDPE) of a conventional heat sealable quality. Most preferably, also a linear low density polyethylene (LLDPE) produced by polymerising an ethylene monomer with a C4-C8 alpha-olefin alkylene monomer in the presence of a metallocene catalyst, i.e. a so called metallocene-LLDPE (m-LLDPE), is employed in one or both of the heat sealing layers.

FIG. 2b shows, in cross-section, a second embodiment of a rigid or semi-rigid multilayer packaging laminate 20b produced according to the invention. The rigidity of the packaging laminate is provided by a core layer 25 of paperboard or carton, and the laminate is further provided with outer, heat sealable and liquid tight layers 22, 23 of a thermoplastic polymer, preferably a low density polyethylene or a m-LLDPE, as described above. A barrier layer 24, as described in connection with FIG. 2a above, is applied onto a base layer 21 and consists of a first vapour deposited, by PECVD, silicon oxide layer 24-1 and a second, covalently bound, layer of a cross-linked organopolysiloxane 24-2. The barrier-coated base layer film may be turned in either direction when laminated into a paperboard packaging laminate by a lamination layer 26. The lamination layer is preferably an extruded polyolefin layer and more preferably, a low density polyethylene layer.

FIG. 3 shows a filled packaging container 30 of the type Tetra Brik®, being sealed along a longitudinal seal 31 and at transversal seals 32, near which the package was cut off from the preceding package (46 in FIG. 4) and the continuously filled tube (41 in FIG. 4), respectively. The packaging container of the invention may further be provided with an opening device 33 for easier pouring of the filled product and possibility to re-close the package when it is not yet emptied.

FIG. 4 shows the principle as described in the introduction of the present application, i.e. a web of packaging material is formed into a tube 41 by the longitudinal edges 42, 42' of the web being united to one another in an overlap joint 43. The tube is filled 44 with the intended liquid food product and is divided into individual packages by repeated transversal seals 45 of the tube at a distance from one another below the level of the filled contents in the tube. The packages 46 are separated by incisions in the transversal seals and are given the desired geometric configuration by fold formation along prepared crease lines in the material.

FIG. 5 schematically shows a preferred plant 50 and method for coating of SiOx onto a base film. The base film 51 is subjected to continuous plasma enhanced chemical vapour deposition, PECVD, of SiOx, wherein x=1.7-2.2, from a plasma of an organic silicon compound, such as for example hexamethyldisiloxane (HMDSO) or tetramethyldisiloxane (TMDSO), and the coating is given a thickness of from 5 to 500 nm, preferably from 5 to 200 nm, more preferably from 5 to 100 nm, so that the barrier film 1c is formed.

The invention is not limited by the embodiments shown and described above, but may be varied within the scope of the claims. It is for example to be understood that the barrier film of the invention may be combined with further layers providing functionality, such as further barrier properties or toughness properties or the like.

Furthermore, it is to be understood that conventional adhesion-promoting surface treatments as well as conventional adhesives and primers may be used in order to further enhance integrity properties, i.e. adhesion between layers, of packaging laminates and packages and chosen to suit a certain laminated material structure.

EXAMPLES

1. Chemicals and Materials Used

TABLE 1.1

| | | SiOx/PET | |
|---|---|---|---|
| S. No. | Name of Compound | Manufacturer | Properties |
| 1 | SiOx/PET-1 | PET - DuPont's MYLAR, SiOx by PECVD at Tetra Pak | SiOx - 10 nm/ PET 12 µm |
| 2 | SiOx/PET-2 | PET - DuPont's MYLAR, SiOx by PECVD at Tetra Pak | SiOx - 50 nm/ PET 12 µm |

The healing layer coating tests were carried out on films of 12 µm thick PET coated with a silicon oxide of the general formula SiOx, where in x is from about 1.7 to about 2.2, by means of plasma enhanced chemical vapour deposition PECVD. Thicknesses of the SiOx-coating of 50 nm and 10 nm were tested, respectively.

The unsaturated organosilane monomers that were tested are MAPS and VS, as seen in Table 1.2. The organosilane was dissolved to a concentration of from 3 to 6 weight-% in ethanol and further a photoinitiator was included in the solution composition at an amount from 2 to 5 weight-% as listed in Table 1.2. The organosilane solution composition was applied as a liquid film on top of the SiOx layer by means of a transfer roller which was dipped into the solution composition and then contacted with the SiOx surface. The thickness of the thus applied coating of organosilane was about 25 nm.

TABLE 1.2

| | | Silanes and photo initiators | | | |
|---|---|---|---|---|---|
| No. | Name of Compound | Manufacturer | Structure | Properties | characteristics |
| 1 | Gamma-methacryloxypropyltri ethoxysilane (MAPS) | 99% Pure from GE speciality materials, Switzerland | $CH_2=\overset{CH_3}{\underset{|}{C}}-\overset{O}{\underset{\|}{C}}-O-(CH_2)_3-Si\overset{OEt}{\underset{OEt}{\diagdown}}OEt$ | Mol. Wt- 274 No amine Density (g cm$^{-1}$): 1.045 | UV-curable silane |

TABLE 1.2-continued

Silanes and photo initiators

| No. | Name of Compound | Manufacturer | Structure | Properties | characteristics |
|---|---|---|---|---|---|
| 2 | Vinyltrimethoxysilane (VS) | 99% Pure from GE speciality materials, Switzerland | [structure] | Mol. Wt. - 219 No amine, Density (g cm$^{-1}$): 1.12 crosslinkable double bond | UV-curable silane |
| 3 | Phenyl bis(2,4,6-trimethyl benzoyl) (PI-1) | >99% pure Ciba specialty chemicals, Switzerland | [structure] | MP 127-133° C. Light yellow powder | UV-Photoinitiator |
| 4 | 2-Benzyl-2-dimethylamino-1-(4-morpholinophenyl)-butanone-1 (PI-2) | >99% pure Ciba speciality chemicals, Switzerland | [structure] | Mol. Wt - 366.5 Melting pt. 115° C. | Photo-initiator, dissociates heterolytically |

2. OTR Under Tensile Strain of Non-Treated SiOx/PET Films

Film samples taken from PEVCD SiOx deposition-coated PET films were prepared for oxygen transmission rate (OTR) measurements whilst the samples were submitted to uniaxial straining force. The measurement device consists of a straining apparatus mounted on a Mocon® oxygen diffusion cell. The arrangement allows simultaneous measurement of OTR and position of the crack onset strain (COS) as function of the uniaxial straining force applied on the samples. At straining beyond the COS critical point, the oxygen gas diffusion through the samples increased by one order of magnitude due to fragmentation of the SiOx or organosilane/SiOx layers. OTR was measured for each 1.0% step increase of the nominal strain.

The OTR measurements of non-treated samples have been made for 10- and 50-nm thick SiOx layers PECVD deposited onto 12-μm PET films. Table 2.1 and Table 2.2 list the respective OTR measurement points for plain SiOx/PET films without the deposition of the healing organosilane coating.

TABLE 2.1

OTR data points measured from strained 10-nm thick SiOx layers not treated with organosilane.

| Nominal Strain (%) | SiOx 10 nm #1 | SiOx 10 nm #2 | SiOx 10 nm Average | Standard Deviation |
|---|---|---|---|---|
| 0 | 1.8 | 1.72 | 1.76 | 0.06 |
| 1 | 1.62 | 1.9 | 1.76 | 0.20 |
| 2 | 2.28 | 1.93 | 2.11 | 0.25 |
| 3 | 2.36 | 1.81 | 2.09 | 0.39 |
| 4 | 1.98 | 2.02 | 2.00 | 0.03 |
| 5 | 56.03 | 2.03 | 29.03 | 1.00 |

TABLE 2.2

OTR data points measured from strained 50-nm thick SiOx layers not treated with organosilane.

| Nominal Strain (%) | SiOx 50 nm #1 | SiOx 50 nm #2 | SiOx 50 nm #3 | SiOx 50 nm Average | Standard Deviation |
|---|---|---|---|---|---|
| 0 |  | 1.38 | 1.79 | 1.59 | 0.29 |
| 1 | 2.55 | 2.37 | 2.58 | 2.50 | 0.15 |
| 2 | 5.42 | 4.27 | 5.03 | 4.91 | 0.54 |
| 3 | 6.44 | 19.39 | 60.43 | 28.75 | 29.02 |
| 4 | 28.89 | 59.33 | 100.53 | 62.92 | 29.13 |
| 5 | 110 | 100 | 90 | 100.00 | 28.28 |

3. OTR Under Tensile Strain of Organosilane-Healed Films

Samples of 50 nm SiOx-coated 12 μm PET films were prepared in roll form at a liquid film coating pilot line by coating of the organosilane layer on the SiOx side and subsequently curing by UV-irradiation prior to rewinding. MAPS-1 and MAPS-2 were formulations with Gamma-methacryloxypropyltriethoxysilane diluted in ethanol at 3 weight-% with the addition of an amount of 2 to 5 weight-% of photo-initiators PI-1 and PI-2 respectively. VS-1 and VS-2 were formulations with vinyltrimethoxysilane diluted in ethanol at 3 weight-% with the addition of an amount of 2 to 5 weight-% of photo-initiators PI-1 and PI-2 respectively (see Table 1.2 for PI-1 and PI-2 compounds). The 4 organosilane formulations have been applied at a thickness of about 25 nm prior to the UV-curing irradiation step and coil rewinding. Film samples taken from the prepared coils were mounted on the apparatus for measuring OTR of strained samples as described above.

Figure 6:
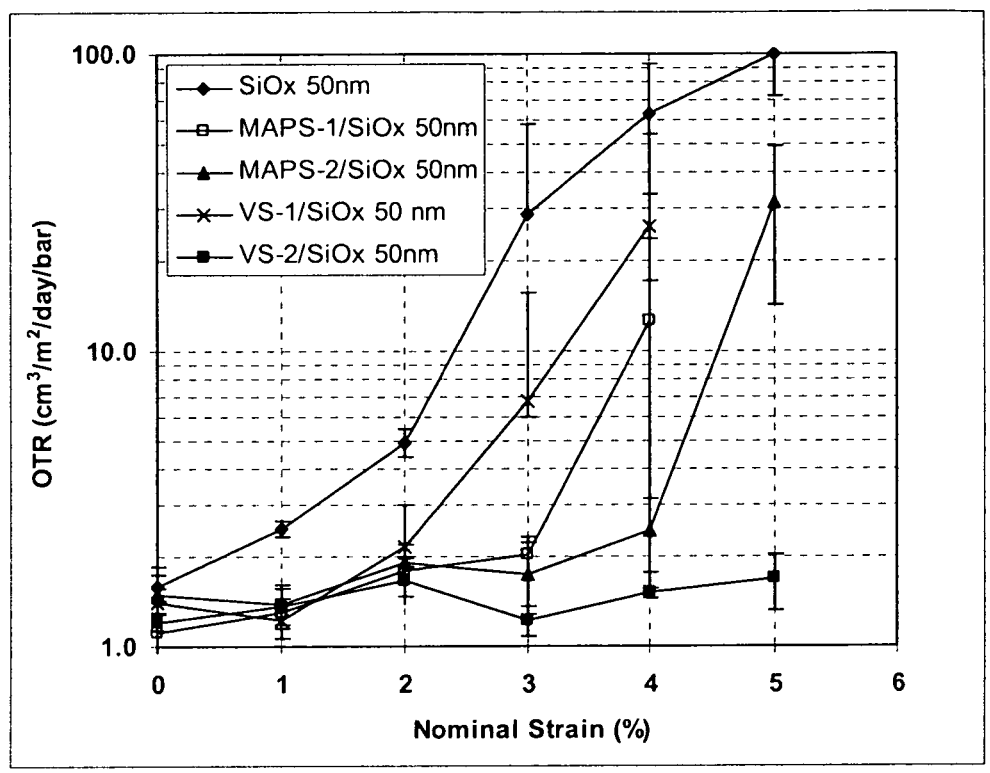

Table 3.1 summarizes the OTR data for the respective treatments with MAPS-1, MAPS-2, VS-1 and VS-2 formulations. FIG. 6 shows semi-log plots of the OTR data as a function of nominal strain. This figure shows also the OTR data taken from strained SiOx/PET samples without the organosilane treatment from Table 2.2. The effect of the UV-cured organosilane is clearly observable by comparing the COS position of the different samples. The non-treated SiOx/PET samples have a COS at 2% nominal strain, whilst MAPS-treated and VS-treated SiOx/PET samples show COS at 3%, 4% and beyond 5% depending on the photo-initiator compounds, PI-1 or PI-2, mixed in the solution. The photoinitiator no. 2, i.e. the amino-functional photoinitiator, produced the best improvement of COS, and OTR.

TABLE 3.1

OTR points measured from strained SiOx layers 50 nm thick treated with MAPS-1, MAPS-2, VS-1 and VS-2 healing formulations.

| Nominal Strain (%) | MAPS-1 SiOx 50 nm | MAPS-2 SiOx 50 nm | VS-1 SiOx 50 nm | VS-2 SiOx 50 nm |
|---|---|---|---|---|
| 0 | 1.12 | 1.51 | 1.40 | 1.21 |
| 1 | 1.31 | 1.38 | 1.22 | 1.37 |
| 2 | 1.80 | 1.91 | 2.18 | 1.66 |
| 3 | 2.06 | 1.76 | 6.81 | 1.22 |
| 4 | 12.70 | 2.47 | 26.17 | 1.52 |
| 5 |  | 31.56 |  | 1.69 |

FIG. 6 shows semi-log plots of OTR data taken during straining of 50 nm thick SiOx barrier coatings deposited on PET 12 μm films by PECVD. The graph shows the OTR behaviour for non-treated SiOx/PET samples and SiOx/PET samples treated with the organosilane formulations MAPS-1, MAPS-2, VS-1 and VS-2.

Figure 7:
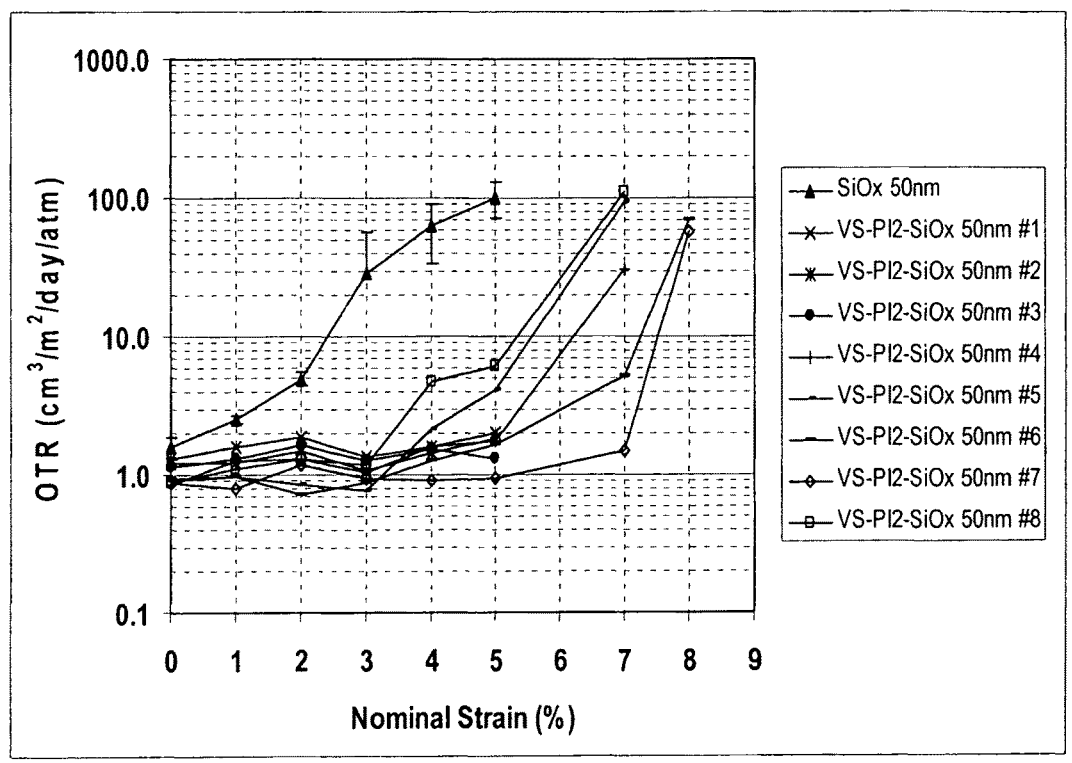

From the above data, it is obvious that the VS-2 healing composition (3% Vinylsilane with photo-initiator PI-2 in ethanol) was the best formulation. Therefore, eight consecutive tests with this particular healing composition were carried out to check the repeatability of the results. Table 3.2 lists the OTR results of samples under strain and treated with the VS-2 formulation. The semi-log plots of FIG. 7 depict the behaviour for the eight VS-2 treated SiOx/PET samples. For ease of comparison, the OTR data of the non-treated SiOx/PET samples from Table 2.2 are plotted in FIG. 7.

eight samples, seven have a COS at 5%, whilst 6% is reached by one sample. For the non-treated 50-nm thick SiOx layers, the behaviour is much different from the organosilane-modified samples: the COS is localized around 2% nominal strain and the OTR, at 5%, reaches 100-cm$^3$/m$^2$/day/bar.

One other important feature of the polysiloxane formation is the improvement of oxygen barrier of healed SiOx layers. This improvement is clearly shown in FIG. 7, where all treated samples exhibit a much lower OTR compared to 1.6-cm$^3$/m$^2$/day/bar for non treated sample.

Figure 8:
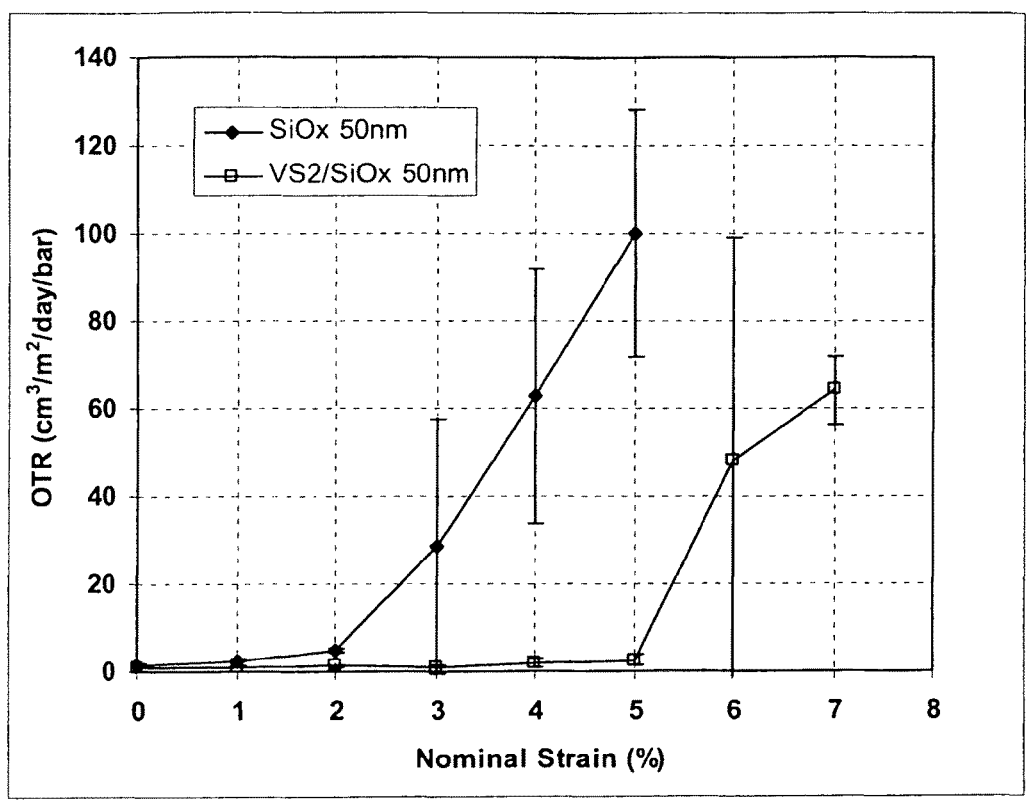

Averaging OTR measurements for each data point gives a clear picture of the healing effectiveness of the VS-2 organosilane formulation compared to the non-treated 50-nm SiOx/PET sample data from Table 2.2. This is showed at FIG. 8, which presents OTR data in a linear plot. FIG. 8 shows the OTR data measured from strained 50 nm thick SiOx barrier coatings deposited on PET 12-μm films by PECVD. The graph shows the average OTR data from the eight SiOx/PET samples treated with the VS-2 organosilane formulation and the behaviour of the 3 non-treated SiOx/PET samples of Table 2.2

For cost reduction it is interesting to coat polymer films with as thin oxide coating as possible. To this end a similar study was performed on 10-nm SiOx barrier layer deposited on PET 12-μm films by PECVD. After subsequent VS-2 organosilane treatment and UV-curing, film samples have been submitted to the strain OTR test. The data are presented in Table 3.3 and are plotted in FIG. 9. In this Figure the OTR measurements of non-treated samples of Table 2.1 are also plotted.

TABLE 3.3

OTR points measured from 3 straining tests on SiOx layers 10 nm thick treated with VS-2 organosilane formulation

| Nominal Strain (%) | VS-2/SiOx 10 nm #1 | VS-2/SiOx 10 nm #2 | VS-2/SiOx 10 nm #3 |
|---|---|---|---|
| 0 | 1.47 | 1.57 | 0.71 |
| 1 | 1.53 | 1.85 | 0.63 |

TABLE 3.2

OTR points taken from 8 straining tests on SiOx layers 50 nm thick treated with VS-2 organosilane formulation.

| Nominal Strain (%) | VS-2/SiOx 50 nm #1 | VS-2/SiOx 50 nm #2 | VS-2/SiOx 50 nm #3 | VS-2/SiOx 50 nm #4 | VS-2/SiOx 50 nm #5 | VS-2/SiOx 50 nm #6 | VS-2/SiOx 50 nm #7 | VS-2/SiOx 50 nm #8 |
|---|---|---|---|---|---|---|---|---|
| 0 | 1.28 | 1.20 | 1.15 | 0.86 | 0.95 | 0.91 | 0.88 | 0.89 |
| 1 | 1.59 | 1.23 | 1.29 | 1.26 | 0.96 | 0.97 | 0.79 | 1.09 |
| 2 | 1.84 | 1.48 | 1.66 | 1.32 | 0.86 | 0.73 | 1.18 | 1.30 |
| 3 | 1.33 | 1.07 | 1.27 | 1.04 | 0.77 | 0.87 | 0.93 | 1.16 |
| 4 | 1.56 | 1.45 | 1.54 | 1.59 | 2.10 | 1.24 | 0.92 | 4.67 |
| 5 | 2.00 | 1.78 | 1.29 | 1.77 | 4.16 | 1.65 | 0.93 | 6.20 |
| 6 |  |  |  | 30.28 | 94.20 | 5.11 | 1.49 | 110.50 |
| 7 |  |  |  |  |  | 70.10 | 58.00 |  |

FIG. 7 shows the semi-log plots of the OTR data measured from strained SiOx 50 nm thick barrier coatings deposited on PET 12 μm films by PECVD. The graph shows the OTR behaviour of the eight SiOx/PET samples treated with the VS-2 organosilane formulation. It shows also the behaviour of non-treated SiOx/PET samples as a function of nominal strain.

FIG. 7 shows the typical behaviour of healed samples where the OTR is constant below the critical strain (COS) and increases dramatically beyond this point. Out of the TABLE 3.3-continued OTR points measured from 3 straining tests on SiOx layers 10 nm thick treated with VS-2 organosilane formulation

| Nominal Strain (%) | VS-2/SiOx 10 nm #1 | VS-2/SiOx 10 nm #2 | VS-2/SiOx 10 nm #3 |
|---|---|---|---|
| 2 | 1.48 | 1.63 | 1.00 |
| 3 | 2.23 | 2.07 | 0.91 |

TABLE 3.3-continued

OTR points measured from 3 straining tests on SiOx layers
10 nm thick treated with VS-2 organosilane formulation

| Nominal Strain (%) | VS-2/SiOx 10 nm #1 | VS-2/SiOx 10 nm #2 | VS-2/SiOx 10 nm #3 |
|---|---|---|---|
| 4 | 2.24 | 1.94 | 0.95 |
| 5 | 3.45 | 2.35 | 1.27 |
| 6 | 11.90 | 8.04 | 0.73 |
| 7 | | 13.50 | 50.00 |

Figure 9:
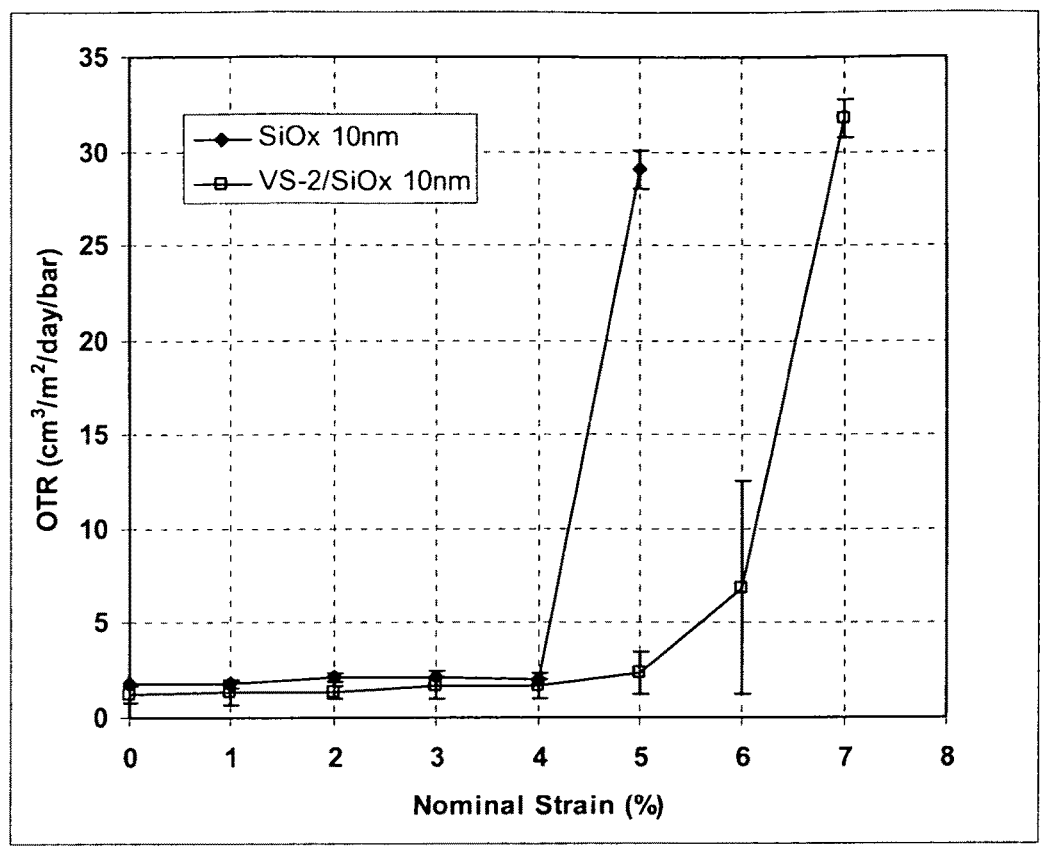

FIG. 9 shows OTR data taken from strained 10 nm thick SiOx barrier coatings deposited on PET 12-μm films by PECVD. The graph shows the average OTR from the three SiOx/PET samples of Table 3.3 treated with the VS-2 organosilane formulation and the behaviour of the non-treated SiOx/PET samples of Table 2.1

The oxygen barrier of the treated samples increase with the formation of the polysiloxane hybrid and the corresponding COS is between 5 and 6% nominal strain. The improvement is less drastic than for the thicker SiOx layers. One other feature of SiOx oxide barriers is the COS position dependence on the SiOx thickness. This dependence is clearly seen when looking at the COS positions of non-treated samples of 10 nm and 50 nm thickness, respectively. The COS of the 10 nm thick SiOx layers is positioned at 4%, whilst at 2% only for 50 nm thick SiOx layers (FIGS. 6-8 and 9, respectively). This difference might explain why the healing effect of the crosslinked organosilane is less active with the thinner SiOx layer.

The conclusions from the above Examples are, thus, the following.
The 50 nm and 10 nm un-coated not organosilane-healed SiOx/PET samples have COS at 2 and 4%, respectively.
The 3% Vinylsilane-coated 50 nm and 10 nm SiOx/PET samples have COS at 6% and 5.5% respectively.
By coating 3% VS-2, a tremendous improvement of the COS of 50 nm SiOx/PET has been observed while the same silane shows a smaller improvement of the COS of 10 nm SiOx/PET.
By coating 3% VS-2, a large decrease of the oxygen transmission OTR is furthermore observed for both 10 nm and 50 nm SiOx/PET samples.

The invention claimed is:

1. Barrier film for packaging of food or beverage comprising a base film of a polymer and applied onto the base film, an inorganic barrier layer comprising an inorganic oxide selected from the group consisting of silicon oxide and aluminium oxide deposited by a vapour deposition method, wherein the deposited inorganic barrier layer is further coated with a healing layer of a crosslinked organopolysiloxane that is formed by a liquid film coating method in which a healing layer coating composition comprising a photoinitiator which is 2-benzyl-2-dimethylamino-1-(4-morpholinophenyl)-butanone-1 is applied to the barrier layer and cured by UV irradiation, wherein the organopolysiloxane is covalently bound to the inorganic barrier layer, wherein the coated healing layer is a reaction product from a liquid composition containing at least 95 weight percent of unsaturated organosilanes having three silanol-forming groups and consisting essentially of a reactive unsaturated silane selected from the group consisting of vinyltrimethoxysilane, vinyltriethoxysilane and mixtures thereof, and the organopolysiloxane is crosslinked at the sites of unsaturation.

2. Barrier film according to claim 1, wherein the inorganic barrier layer comprises, at least at a surface of the inorganic barrier layer, aluminium oxide.

3. Barrier film according to claim 1, wherein the inorganic barrier layer comprises silicon oxide further containing covalently bound carbon in its formula (SiOxCy), wherein x is from 0.1 to 2.5 and y is from to 0.1 to 2.5.

4. Barrier film according to claim 1, wherein said deposited inorganic barrier layer has a thickness of from 5 to 500 nm.

5. Barrier film according to claim 1, wherein the base film comprises a polymer layer for receiving the deposited inorganic barrier layer, said polymer layer is made of a material selected from the group consisting of polyethylene terephthalate (PET) and polyamide (PA).

6. Barrier film according to claim 1, wherein said deposited inorganic barrier layer has been applied by plasma enhanced chemical vapour deposition (PECVD).

7. Barrier film according to claim 1, wherein said deposited inorganic barrier layer has been applied by atmospheric plasma coating or combustion chemical vapour deposition (CCVD).

8. Barrier film according to claim 1, wherein said coated healing layer has a thickness of from 1 to 50 nm.

9. Barrier film according to claim 1, wherein said deposited inorganic barrier layer has a thickness of from 5 to 200 nm.

10. Barrier film according to claim 1, wherein said coated healing layer has a thickness of from 10 to 30 nm.

11. Barrier film according to claim 1, wherein a content of silanes other than unsaturated silanes having three silanol-forming groups is less than 3 weight percent of the total silane coating composition.

12. Multilayer packaging laminate for packaging of food or beverage comprising the barrier film according to claim 1, and a heat-sealable polyolefin-based layer.

13. Packaging laminate for rigid or semi-rigid food or beverage containers comprising a core layer of paperboard or carton, outermost heat sealable, liquid tight layers of a polyolefin-based polymer, and the barrier film according to claim 1.

14. Packaging container for packaging of food or beverage manufactured from the barrier film or packaging laminate as specified in claim 1.

15. Method of manufacturing a barrier film for packaging food or beverage as specified in claim 1, comprising
providing a base film of a polymer;
applying onto the base film, an inorganic barrier layer comprising an inorganic oxide by a vapour deposition method;
further coating said deposited inorganic barrier layer wherein the further coating step comprises:
providing a composition of a reactive unsaturated silane compound having three silanol-forming groups dissolved in a solvent;
coating the composition onto the deposited inorganic barrier layer;
subjecting the coated composition to hydrolysis and condensation reaction to provide an ethylenically unsaturated organosiloxane oligomer, which is covalently bound to the inorganic barrier layer;
curing the coated organosiloxane oligomer to provide the crosslinked healing layer.

16. Method of manufacturing a barrier film for packaging food or beverage according to claim 15, wherein the reactive unsaturated silane compound is dissolved in a solvent at a concentration of from 1 to 10 weight percent.

17. Method of manufacturing a barrier film for packaging food or beverage according to claim 15, wherein the coating composition with the unsaturated silane compound is coated at a thickness of from 1 to 50 nm as measured before curing.

18. Method of manufacturing a barrier film for packaging food or beverage according to claim 15, wherein the reactive unsaturated silane compound is dissolved in a solvent at a concentration of from 3 to 6 weight percent and coated at a thickness of from 10 nm to 30 nm, as measured before curing.

19. Method of manufacturing a barrier film for packaging food or beverage according to claim 1, wherein the photoinitiator is added at an amount of from 1 to 10 weight percent.

* * * * *